(12) United States Patent
Arnone et al.

(10) Patent No.: US 8,991,661 B2
(45) Date of Patent: Mar. 31, 2015

(54) MATERIAL HANDLING APPARATUS

(75) Inventors: Anthony J. Arnone, West Valley, NY (US); Michael J. Helm, West Seneca, NY (US); Jason L. Kerkeslager, Amherst, NY (US); David S. Payne, West Seneca, NY (US); David J. Perry, East Amherst, NY (US); Thomas H. Powers, Mayville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 410 days.

(21) Appl. No.: 13/084,534

(22) Filed: Apr. 11, 2011

(65) Prior Publication Data

US 2012/0257951 A1    Oct. 11, 2012

(51) Int. Cl.
*G01F 11/20*    (2006.01)
*B65G 47/14*    (2006.01)

(52) U.S. Cl.
CPC ................... *B65G 47/1485* (2013.01)
USPC .......................................... 222/414; 209/219

(58) Field of Classification Search
USPC ............... 414/304; 209/223.2, 228, 288, 219; 222/410, 414
See application file for complete search history.

(56) References Cited

U.S. PATENT DOCUMENTS

| | | | | |
|---|---|---|---|---|
| 3,016,145 A | * | 1/1962 | Spodig | 209/223.2 |
| 3,145,844 A | * | 8/1964 | Powers | 209/562 |
| 3,922,219 A | | 11/1975 | Lee et al. | |
| 3,947,349 A | * | 3/1976 | Fritz | 209/214 |
| 4,225,047 A | * | 9/1980 | Grubman | 209/544 |
| 4,358,920 A | * | 11/1982 | Kanai et al. | 53/516 |
| 4,881,731 A | * | 11/1989 | Simpson-Davis | 271/315 |
| 4,896,836 A | * | 1/1990 | Mitchell | 241/81 |
| 4,992,410 A | * | 2/1991 | Cullen et al. | 502/407 |
| 5,887,696 A | * | 3/1999 | Goetz | 194/208 |
| 5,893,448 A | * | 4/1999 | Miyamoto et al. | 198/389 |
| 5,901,874 A | * | 5/1999 | Deters | 220/694 |
| 6,259,107 B1 | | 7/2001 | Becraft et al. | |
| 6,321,509 B1 | | 11/2001 | DelDuca et al. | |
| 6,561,377 B1 | * | 5/2003 | Pearson et al. | 221/7 |
| 8,146,767 B1 | * | 4/2012 | Grant | 220/263 |
| 2003/0111484 A1 | * | 6/2003 | Pearson et al. | 221/211 |

(Continued)

FOREIGN PATENT DOCUMENTS

KR    20020003134 A    1/2002
KR    20100034871 A    4/2010

OTHER PUBLICATIONS

PCT Notification of Transmittal of the International Search Report and the Written Opinion of the International Searching Authority, or the Declaration, dated Nov. 7, 2012, in corresponding international Application No. PCT/US2012/032834 (2 pages).
PCT International Search Report, dated Nov. 7, 2012, in corresponding International Application No. PCT/US2012/032834 (3 pages).

(Continued)

*Primary Examiner* — Saul Rodriguez
*Assistant Examiner* — Glenn Myers
(74) *Attorney, Agent, or Firm* — Lee & Hayes, PLLC

(57) ABSTRACT

A material handling apparatus for conveying an article having a ferromagnetic component includes a hopper, a discharge, and a magnet. The hopper has an inlet and outlet and defines a hopper volume for receiving a plurality of the articles to be conveyed. The discharge is spaced from and downstream of the hopper. The magnet is movable between an attracting position proximate the hopper and a discharge position proximate the discharge.

20 Claims, 12 Drawing Sheets

(56) References Cited

U.S. PATENT DOCUMENTS

2004/0174268 A1* 9/2004 Scott et al. .................. 340/686.6
2008/0237098 A1* 10/2008 Saho et al. .................... 210/137

OTHER PUBLICATIONS

PCT Written Opinion of the International Searching Authority, dated Nov. 7, 2012, in corresponding International Application No. PCT/US2012/032834 (4 pages).

* cited by examiner

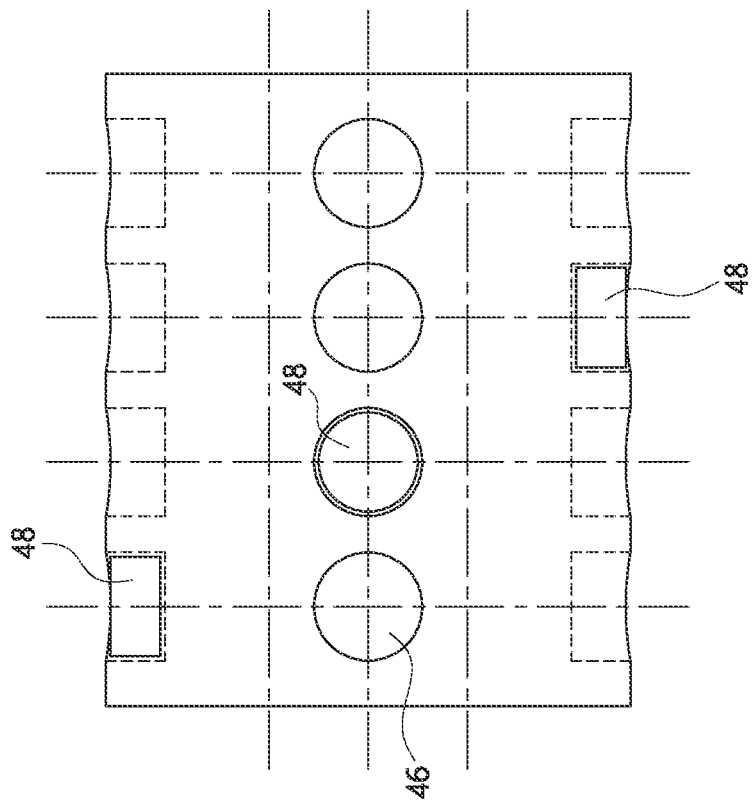
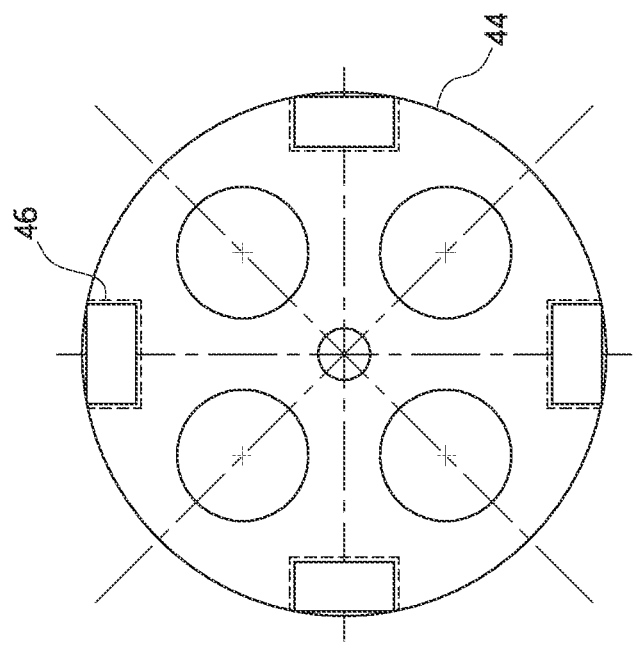
FIG. 3B
FIG. 3A

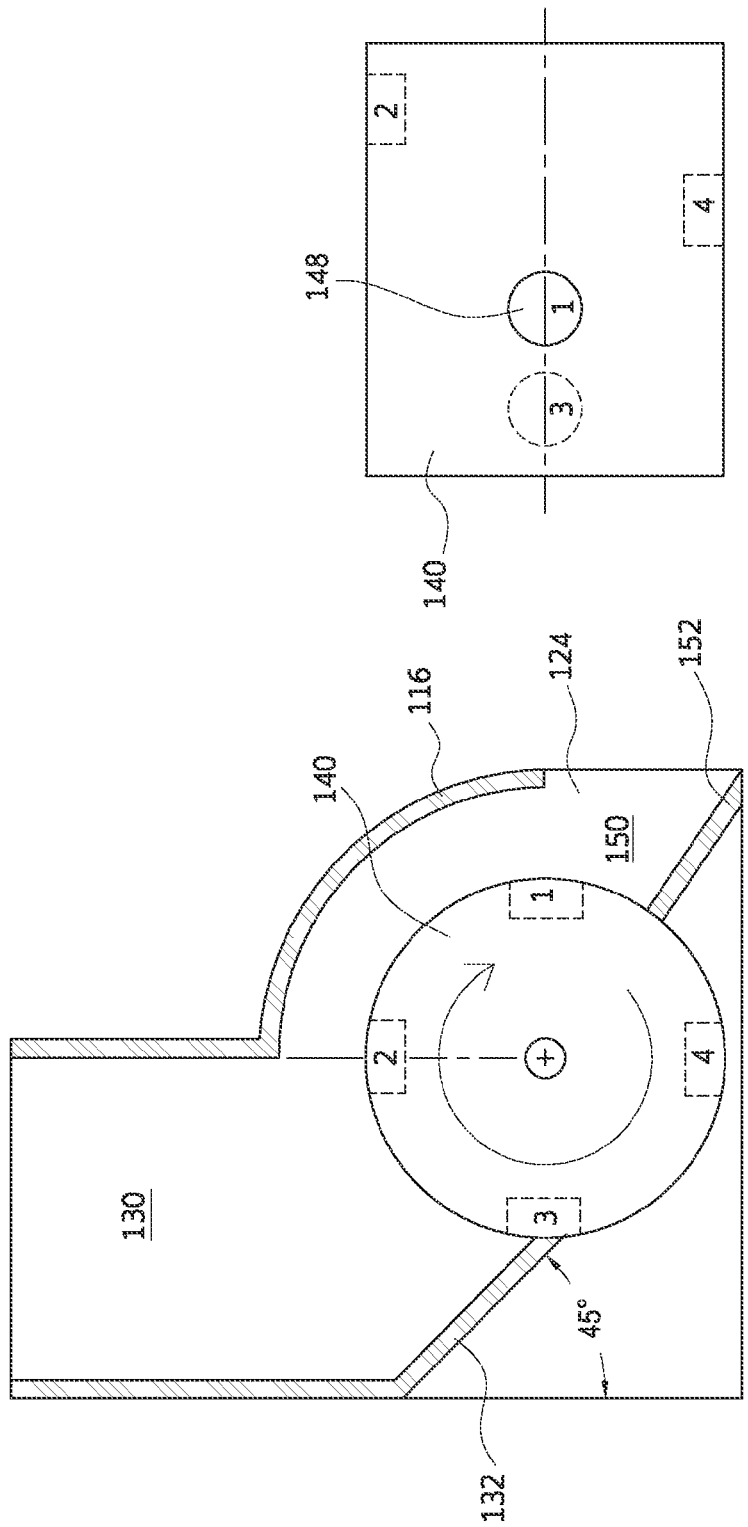

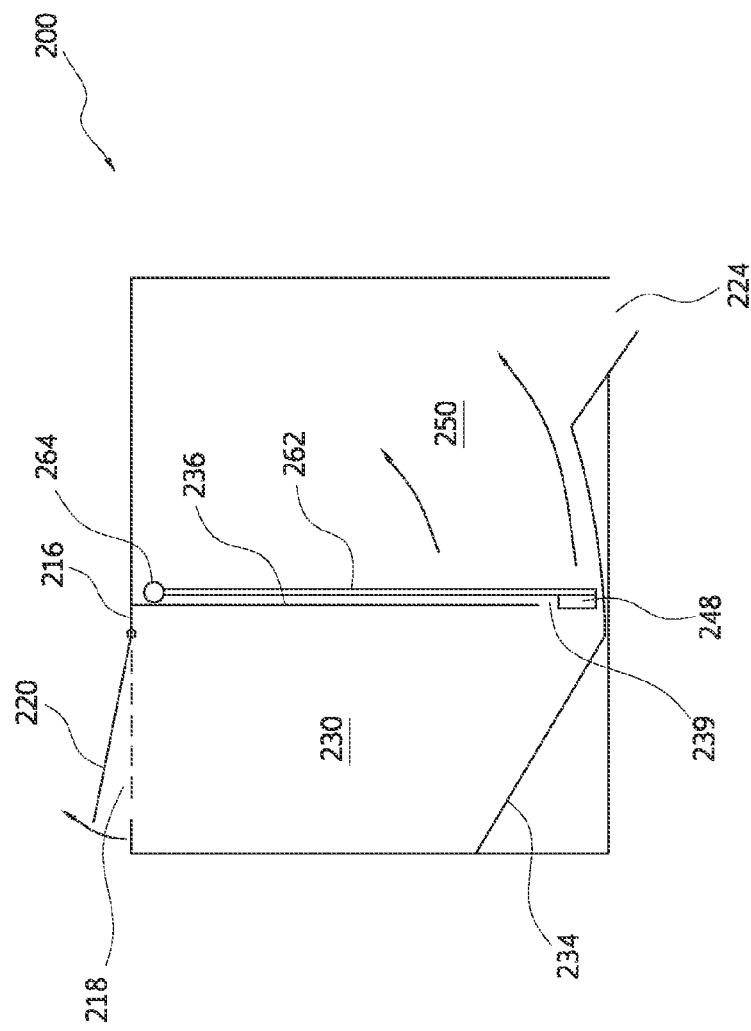

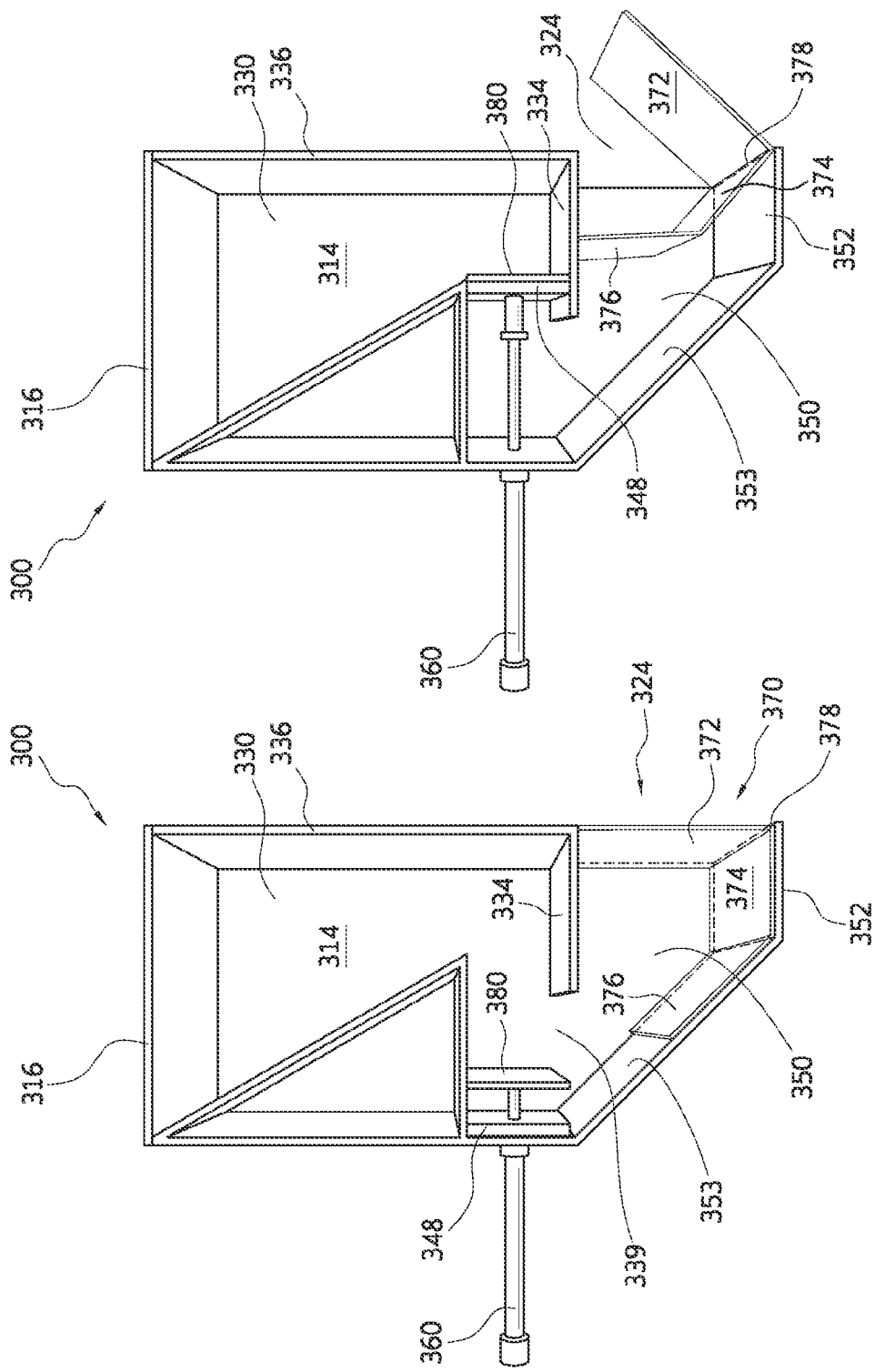

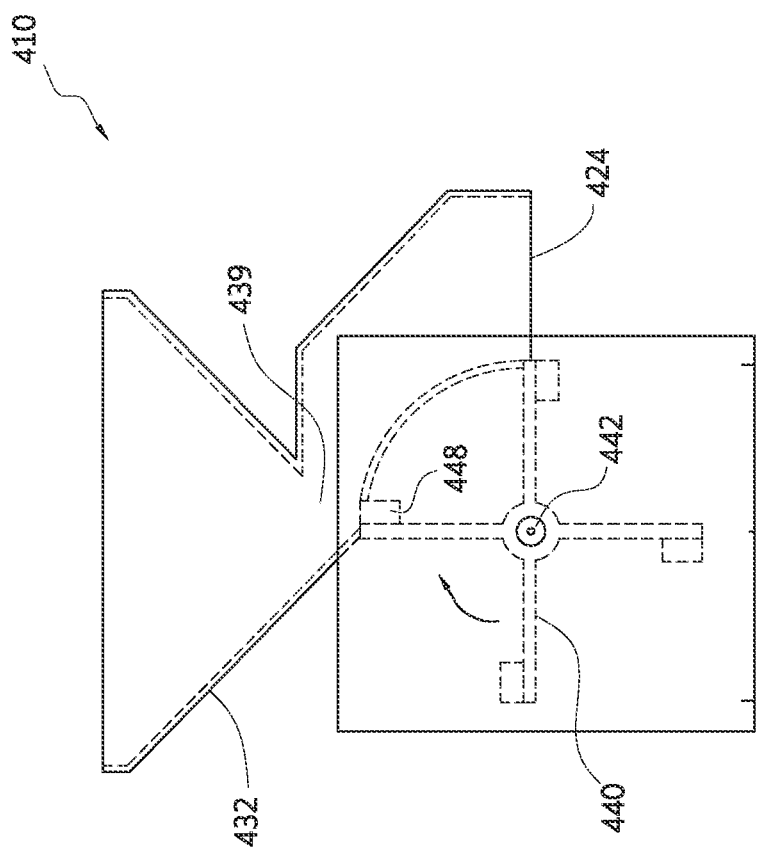

MATERIAL HANDLING APPARATUS

BACKGROUND OF THE INVENTION

1. Technical Field

The present invention relates to material handling. More specifically, the invention relates to a semi-automated or automated handling apparatus for separating and transporting packets holding a metallic-based oxygen absorber.

2. Description of Related Art

The present invention relates to material handling apparatuses. More specifically, the invention relates to handling packets that are metallic-based oxygen absorbers.

Oxygen absorbers are used in a number of applications to remove oxygen from closed spaces. In one application, oxygen absorbers are used in meat packaging applications to suppress degradation of the meat due to oxygen exposure. By removing essentially all oxygen from the package containing raw meat, the meat's freshness can be maintained for longer periods of time. Accordingly, meat can be shipped from processing plants to remote destinations without fear of spoiling during transit.

In applications in some processing plants, line workers manually place oxygen absorbing packets or sachets, such as those having iron powder and an electrolyte, in a package containing meat. The oxygen absorbing packets usually come in a hermetically sealed package, and thus do not begin absorbing oxygen until removed from that sealed package. The packets usually number between about 15 and about 25 per hermetically sealed package and that number of packets are usually used sufficiently quickly that is not necessary to take any additional precautions to ensure continued efficacy of the packets after packaging. That is, the packets generally have enough oxygen absorbing capacity that remaining in the ambient air for a limited time will not significantly affect the shelf life of the meat or other product with which the packet is ultimately placed.

However, if there are interruptions in the packaging process such that the packets are allowed to remain in the ambient air for an extended period of time, the oxygen absorber's efficacy can be greatly reduced. In these instances, and because there is generally no way to tell how much absorbing power is left in most oxygen absorbers, the oxygen absorber should be discarded. However, experience has shown that the line workers generally will use the oxygen absorbers anyway. When very little oxygen absorbing capability is left in the absorber, and it is introduced into a package of meat, that meat can oxidize prematurely and therefore turn brown before being presented for sale at a retailer, thereby potentially rendering the meat unsalable. Specifically, a customer will perceive the meat to be spoiled.

Thus, there is a need in the art for an apparatus that maintains oxygen absorbers in a virtually oxygen free environment, even in the event of a processing slow down or stoppage.

There also is a need in the art for a method of dispensing packets to a user or for automated insertion into a meat containing package or a package containing any oxygen sensitive product.

SUMMARY OF THE INVENTION

The present invention remedies the foregoing needs in the art by providing an apparatus and method for handling articles having a metallic component.

According to one embodiment of the invention, a material handling apparatus for conveying an article having a ferromagnetic component includes a hopper, a discharge, and a magnet. The hopper has an inlet and outlet and defines a hopper volume for receiving a plurality of the articles to be conveyed. The discharge is spaced from and downstream of the hopper. The magnet is movable between an attracting position proximate the hopper and a discharge position proximate the discharge.

In another embodiment, the magnet is disposed on a drum and the drum is rotatable to move the magnet between the attracting position and discharge position.

In another aspect of the invention, the hopper volume is sized to be substantially the same size or slightly greater than a volume of a predetermined number of articles to be dispensed from the hopper.

In yet another aspect of the invention, a method of conveying articles, each article including a ferromagnetic substance, includes a step of providing a hopper having an inlet and outlet. A predetermined number of the articles are placed in the hopper, and the inlet is covered to substantially seal the hopper. Substantially all oxygen is removed from the hopper. A magnet is provided in proximity to the outlet of the hopper and the magnet is moved from an attracting position in which one of the articles in the hopper is attracted to the magnet to a discharge position spaced from the attracting position. The articles are removed from the magnet to a discharge at the discharge position.

In still another aspect of the invention, the hopper is flushed to remove oxygen.

These and other features, aspects and embodiments of the invention will be better understood with reference to the appended drawing figures and following detailed description of the invention in which preferred embodiments of the invention are shown and described.

BRIEF DESCRIPTION OF THE DRAWING FIGURES

FIGS. 3A and 3B are front and side elevation views of a drum used in the embodiments illustrated in FIGS. 1 and 2.

FIGS. 4A and 4B are, respectively, a cross-sectional view of a material handling apparatus according to an alternative embodiment of the invention and an elevation view of a drum used in the material handling apparatus.

FIG. 5 is a cross-sectional view of the material handling apparatus according to still another embodiment of the invention.

FIGS. 6A and 6B are cross-sectional views of a material handling apparatus according to yet another embodiment of the invention.

FIGS. 7A-7C are cross-sectional views of additional embodiments of the material handling apparatus according to the invention.

DETAILED DESCRIPTION OF THE INVENTION

The present invention relates to material handling apparatus and particularly to handling apparatus for articles having ferromagnetic components. The inventors have found that the present invention is particularly useful for handling pouches or sachets that contain a metal powder, and more particularly, an iron powder. As will be appreciated, however, the disclosure is not limited to handling such pouches or sachets. In those embodiments described below in which a magnet is used to move articles, the article could take any form, but should include some ferromagnetic component, and thus is attracted to the magnet. Several of the embodiments described below also can be used to handle articles that do not have ferromagnetic properties, and in fact, some embodiments do not include magnets.

Figure 1:
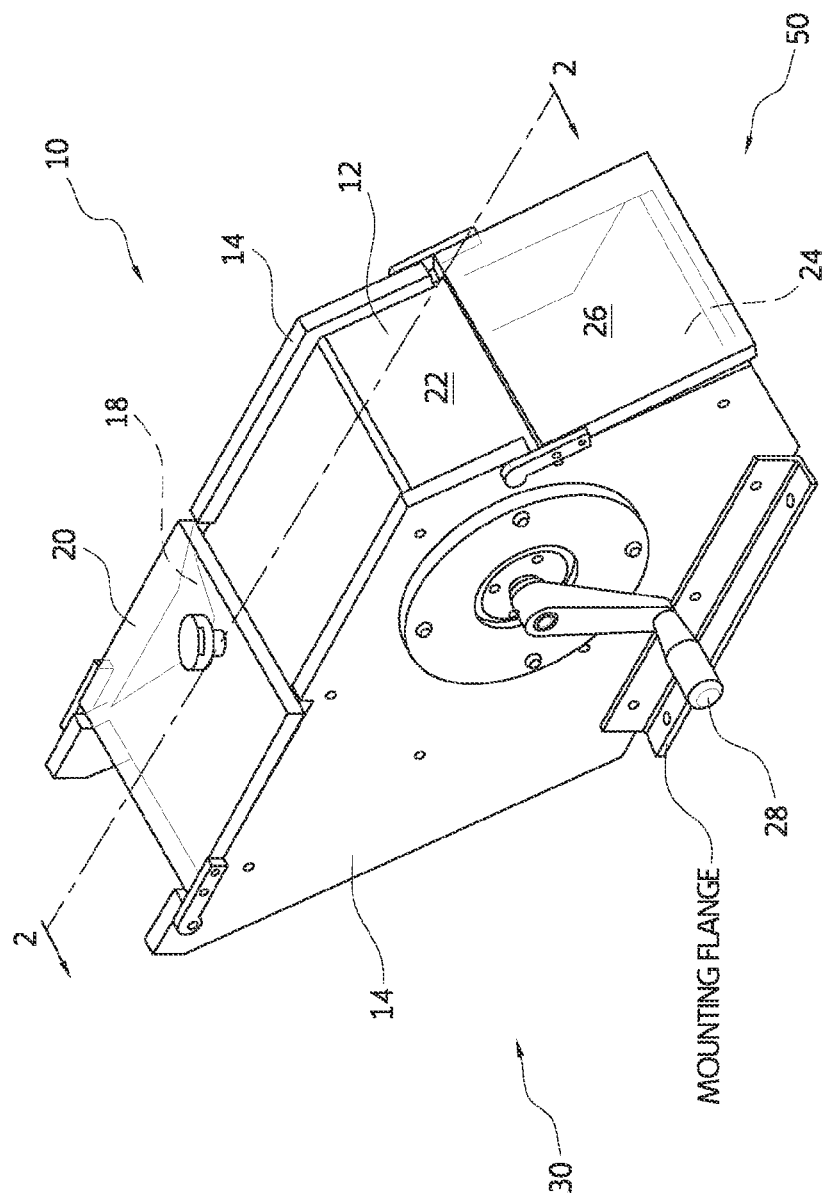
FIG. 1 is a perspective view of an apparatus for conveying articles according to a first embodiment of the invention.

FIG. 1 illustrates one embodiment of the present disclosure. Specifically, FIG. 1 shows a material handling apparatus 10 generally comprised of a body 12. The body 12 includes opposing sides 14, a top 16, and a front 22. An opening or inlet 18 is disposed in the top 16. As will be described in more detail below, the inlet 18 is a hopper inlet allowing access to a hopper 30 having a hopper volume. A hopper access panel 20 also is included to cover the hopper inlet 18 and in some instances seal the hopper volume. A discharge opening 24 is disposed in the front 22 of the material handling apparatus 10 and allows access to a discharge 50, as will also be described in more detail below. A discharge access door 26 selectively covers the discharge opening 24. As also illustrated in FIG. 1, a handle 28 is disposed on a side 14 of the material handling apparatus 10. The function of the handle 28 will be described in more detail below.

Figure 2:
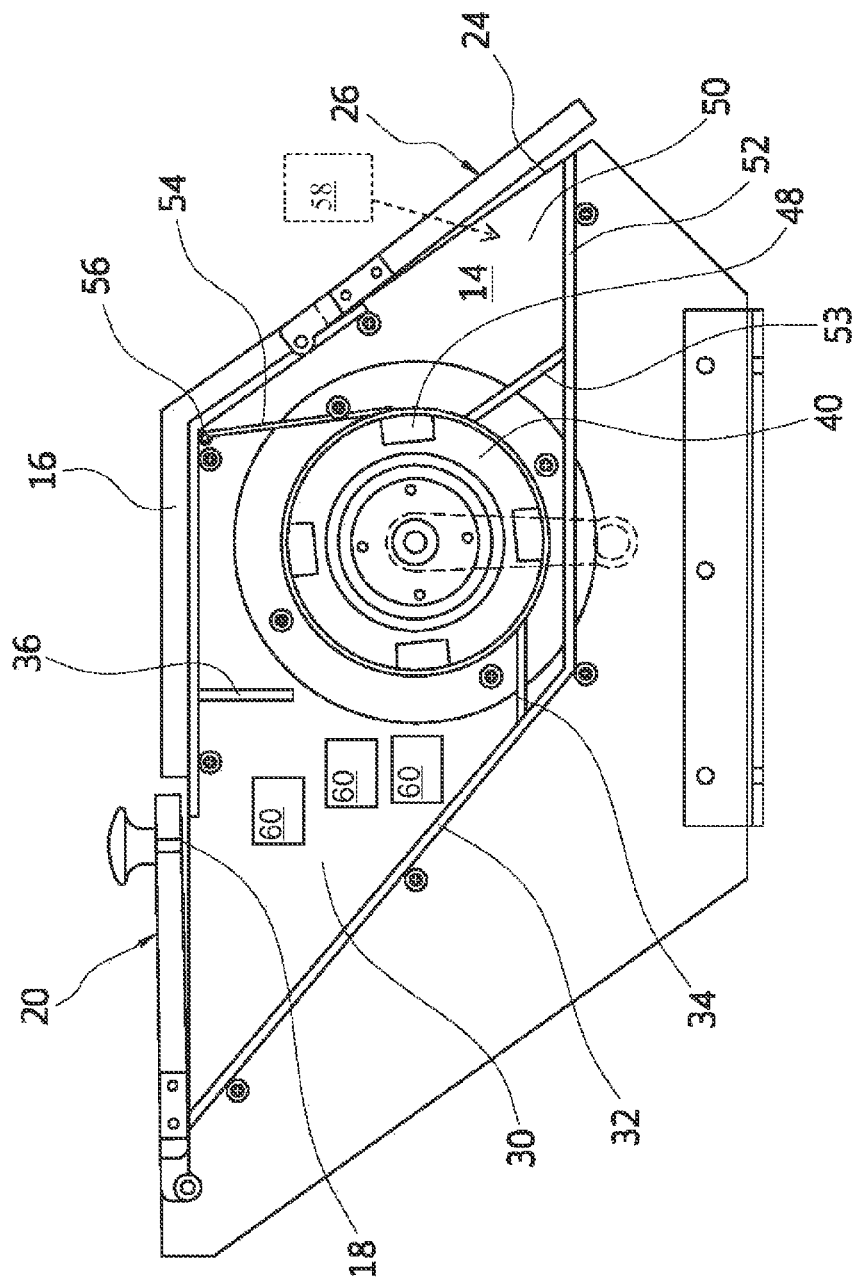
FIG. 2 is a section view taken along section line 2-2 of FIG. 1.

FIG. 2 is a cross-sectional view of the material handling apparatus 10 illustrated in FIG. 1, taken along section line 2-2 of FIG. 1.

As illustrated in FIG. 2, the hopper inlet 18 provides access to the hopper 30. The hopper 30 generally is a volume defined by an inclined wall 32, a bottom 34, a front wall 36, and the sides 14 of the body 12. As generally illustrated, the inclined wall 32 slopes gradually toward the bottom 34 of the hopper 30. The inclined wall preferably is angled relative to a horizontal surface between about 30° and 60°, and more preferably between about 40° and 45°.

The bottom 34 generally extends from the bottom of the inclined wall 32 to a position proximate a drum 40. The drum will be described in more detail with reference to FIGS. 3A and 3B. As illustrated in those figures, the drum 40 has a generally cylindrical outer surface 44 and is rotatable about a longitudinal drum axis 42. A plurality of bores 46 are formed in the outer surface 44 of the drum 40 and magnets 48 are captured in the bores 46.

The magnets 48 may be captured in the bores 46 using a number of methods. For example, the magnets 48 may be press fit into the bores 46 or they may be retained in the bores using some additional fastener such as a screw, bolt, or adhesive. In addition, a wrap or sheet could be laid or otherwise placed over the magnets 48.

The magnets 48 preferably are rare earth magnets, such as molybdenum magnets. As illustrated in FIGS. 3A and 3B, the magnets are round magnets, although the invention is not limited to round magnets. For example, bar magnets or any other shaped magnet could be just as effective in the invention. In the embodiment shown in FIGS. 3A and 3B, sixteen bores are formed about the drum, four equidistantly spaced at 90-degree intervals about the outer surface of the drum 40. A magnet may be disposed in each bore. However, in a preferred embodiment, one magnet is used at each 90-degree interval, spaced circumferentially around the drum 40, and is spaced axially along the drum 40. Thus, as shown in FIG. 3B, only one magnet is placed in each "row" of bores. The result is four magnets being used, spaced equidistantly along the longitudinal drum axis 42. The four magnets also are spaced equidistantly circumferentially about the drum. In a model created by the inventors similar to that shown in FIGS. 3A and 3B, four magnets, each having 1 inch diameters, a half inch thickness and a 37 pound draw were spaced equidistantly axially and circumferentially on the outer surface 44 of the drum 40. More or fewer magnets may be required depending upon the application and the desired effect. Similarly, the spacing both axially and circumferentially could be varied, again depending upon the application and desired effect. Moreover, although sixteen bores are shown in FIGS. 3A and 3B, it is not necessary, and may be undesirable to have more bores than magnets.

Returning to FIG. 2, the material handling apparatus further includes on a side of the drum 40 opposite the hopper 30 a discharge 50. The discharge 50 defines a volume bounded by the drum 40, the sides 14 of the body 12, the front 22, the top 16, a discharge bottom 52, and a discharge back 53. The discharge back 53 preferably terminates proximate the drum 40. The discharge opening 24 allows access into the discharge 50.

In the example illustrated in FIG. 2, proximate the top of the discharge 50 is a flap 54 disposed to swivel on a pivot 56.

In operation, a predetermined number of articles to be conveyed 60 are placed into the hopper 30 and the hopper access panel 20 is placed over the hopper inlet 18 to close the hopper 30. Preferably, the access panel substantially seals the hopper 30, such that there is no airflow between the hopper volume and the ambient atmosphere. To this end, seals, gaskets, or the like may be provided one or both of the hopper access panel 20 and about the hopper inlet 18. The hopper volume preferably is designed to hold the predetermined number of articles to be conveyed and leave little additional space. For example, when the articles to be conveyed are oxygen absorbers, they are removed from the hermetically sealed package in which they are stored, and placed immediately into the hopper. As soon as the oxygen absorbers are removed from the hermetically sealed package, they will begin to absorb oxygen from the ambient atmosphere. Accordingly, all of the absorbers in the package are placed in the hopper and the hopper is sealed. Once in the sealed hopper, the oxygen absorbers will absorb any oxygen in the hopper volume, but if no additional air is entering the hopper volume, the oxygen absorbers will quickly absorb any residual oxygen, but then will stop absorbing, because no more oxygen is present. As noted above, by designing the hopper volume to be substantially the same size as, or slightly larger than the volume occupied by the predetermined number of oxygen absorbers, the amount of oxygen to be absorbed to make the hopper substantially oxygen-free after filling with the absorbers is reduced. Although not required, it may be desirable that the hopper volume be more than 85% and preferably more than 95% filled by the articles to be conveyed.

With the articles in the sealed hopper 30, the drum 40 is rotated clockwise, as oriented in FIG. 2. As one of the magnets 48 passes articles contained in the hopper 30, the article immediately proximate the magnet 48 is attracted to and retained on the outer surface 44 of the drum 40, because it contains a ferromagnetic material. Continued rotation of the drum will transport the retained article from the hopper to the discharge 50. Once in the discharge 50, the article is removed from the drum 40.

In the illustrated embodiment, the discharge back 53 acts as a stripper to remove the article from the drum 40. More specifically, the discharge back 53 prevents movement of the article therepast, but the drum continues to rotate. After sufficient rotation, the magnet is displaced from the article sufficiently that the magnetic field of the magnet no longer retains the article on the drum, and the article falls to rest on the bottom 52 of the discharge 50.

Once the article is removed from the drum, it is retained in the discharge 50, and the user can reach into the discharge 50 to remove the article. In the illustrated embodiment, the user must open the discharge access door to remove the article, although the discharge access door is not required, and could take another form, such as a lid that is completely removable, for example. When used, the access door may help seal the material handling apparatus, for example, to maintain an oxygen-free environment therein.

Using the apparatus illustrated in FIGS. 1 and 2, a user is supplied with a single article each time the drum rotates 90 degrees, because the magnets are spaced circumferentially. Of course, equally spacing more or less magnets about the circumference of the drum will increase or lessen the frequency at which articles are delivered to the discharge.

In the illustrated embodiment, the handle 28 is provided to allow the user to obtain an article when needed. That is, the user can rotate the handle to rotate the drum to supply an article whenever required. A ratcheting mechanism or the like also could be incorporated into the handle/drum combination, for example, so the user cannot rotate the drum in the direction that will not convey articles.

In alternate embodiments, a motor could be provided to rotate the drum. The motor could be stopped and started by the user when another article is needed, or it could be stopped and started using sensor outputs. For example, a sensor 58 could be disposed in the discharge area to recognize presence and/or absence of an article in the discharge. The motor could be driven when no article is detected as present in the discharge, and once an article is detected, the motor could be stopped. In this manner, an article is automatically placed into the discharge when the user takes the previous article. In still other embodiments, the motor could be pre-programmed to provide an article at a certain time interval, for example, to be synchronized with an assembly or processing line. In yet another embodiment, the motor could be set at a constant speed and allowed to continuously rotate.

In the embodiment shown in FIGS. 1 and 2, the discharge back wall 53 terminates generally adjacent the drum and strips the article off the drum, as discussed above. In an alternative embodiment, the magnet 48 could be an electromagnet capable of being selectively magnetized, for example, to attract the article at the hopper outlet and to release the article at the discharge.

As discussed above, the magnets may be spaced axially, generally across the width of the hopper, as defined by the sides 12. As a result of this spacing, the drum 40 will selectively convey articles across the entire width of the hopper, depending upon the position of the magnet. In another embodiment, a bar magnet could span substantially all the way across the axial length of the drum. However, a larger bar magnet could attract more than one article, whereas the illustrated magnets preferably are sized such that they will attract only a single article. To further ensure that multiple articles are not conveyed simultaneously by the drum, one on top of the other, especially when a magnet is used that is powerful enough to hold two articles, the front wall 36 of the hopper also acts as a height gauge to allow only a single article, height-wise to be conveyed. Conveyance of a stacked article will be stopped by the front wall 36.

As noted above, the material handling apparatus 10 also includes a flap 54 disposed on a pivot 56 above the drum 40. A distal end of the flap 54 preferably contacts the drum 40 and rides thereon when the drum 40 rotates. When an article to be conveyed contacts the flap 54, the flap 54 rotates about the pivot 56 to allow for passage of the article, but then returns to its position in contact with the drum. In this manner, airflow into the hopper from the discharge area may be reduced. To this end, the distal end of the flap 54 also may have a wiper seal or the like disposed thereon or incorporated therewith. The flap preferably extends substantially entirely between the sides. In other embodiments, the flap may be a number of flaps arranged next to each other, such that some flaps will remain in contact with the drum as an article passes the flap.

The inclined wall 32 helps to direct articles in the hopper toward the drum 40, so articles are consistently ready for additional conveyance. The sides could similarly be inclined. In other embodiments, the wall may not be inclined, but instead could be vertical. In operation, it is desirable to ensure that all articles will eventually come within the magnetic field of one of the magnets disposed on the drum, to ensure that all articles are eventually conveyed. In other embodiments, a vibration could be imparted on the hopper to aid in movement of articles in the hopper toward the drum 40. For example, an eccentric weight could be applied to a motor used to rotate the drum, and the eccentricity of that weight could result in vibration of the entire apparatus 10.

Although a number of materials could be used in the apparatus 10, the body 12 and drum 40 preferably are made of non-magnetic materials, such as stainless steel or thermoplastics. For example, polyoxymethylene, in the form of Delrin, available from DuPont, may be used to fabricate the body and/or the drum. Although not required, it may further be desirable to make at least part of the apparatus transparent or otherwise see-through so a user can readily identify an amount of articles remaining in the hopper and/or whether an article is present in the discharge. In one embodiment, the hopper access panel and the discharge access door could be see-through. In other embodiments, a viewing window, made of a transparent material, could be included in one or more surfaces of the body 12 of the material handling apparatus 10.

As noted above, the hopper access door and the discharge access door preferably are sealable relative to the body 12. Additional seals also may be incorporated into the apparatus 10 to curb additional air flow in to the sealed space defined by the hopper 30 or the hopper 30 and discharge 50 combination. For example, in FIG. 2, a seal could be provided on a distal end of one or both of the hopper bottom 34 and the discharge back 53, to create a seal with the drum. Moreover, seals may be provided at any and all joints or intersections in the apparatus. The seals may be any known seal, including but not limited to gaskets, caulks, adhesives, and wiper seals.

FIG. 4A is a cross-sectional view of another material handling apparatus 100 according to the invention.

Like the material handling apparatus 10 shown in FIGS. 1 and 2, material handling apparatus 100 generally includes a hopper 130, a drum 140 disposed downstream of the hopper 130 and a discharge 150 disposed downstream of the drum 140. Also, a plurality of magnets is retained in the drum. In the apparatus 100, the hopper 130 is generally vertically oriented, having no horizontal bottom. Instead, an inclined wall 132 terminates proximate the drum 140. Generally above the drum 140 is an arcuate top 116 that is substantially coaxial with the drum 140. The top 116 is preferably spaced from the outer surface 144 of the drum 140 such that only a single article can pass therebetween. Thus, the top 116 acts as a stripper to ensure that multiple articles, one on top of another, will not be dispensed into the discharge 160.

The discharge 150 generally comprises an angled bottom 152. When an article is retained on the drum 140 and moved from the hopper 130 to the discharge 150, the discharge bottom 152 stops the article from continuing on the drum, thereby removing the article from the magnet. Because of the incline, the discharge angled bottom 152 acts as a discharge chute, whereby the conveyed article slides down the angled bottom 152 and through the discharge opening 124 to a user. A tray, receptacle, or the like (not illustrated) may be provided below the angled bottom, to catch the article emerging through the discharge opening.

The arrangement of the magnets 148 in this embodiment is illustrated in FIG. 4B. Like in the embodiments discussed above, the magnets 148 are spaced equidistantly axially and circumferentially. Other magnet arrangements could be used in any of the embodiments. For example, the inventors have constructed a model in which four magnets are used on an outer surface of a drum, but two are disposed substantially at the longitudinal center of the drum but spaced 180-degrees circumferentially. Thus, the first and second magnets are about halfway from either end of the drum, but on opposite sides. A third magnet is then spaced axially from the first and second magnets in one direction, i.e., closer to an end of the drum, and 90-degrees circumferentially with respect to both. The fourth magnet is also spaced axially from the first and second magnets, but on a side of those magnets opposite the third magnet. This fourth magnet is spaced circumferentially about the drum 180-degrees from the third magnet. Thus, when the drum is rotated, it will alternately attract articles near the center of the drum, nearer a first end of the drum, near the center of the drum, and nearer the second end of the drum. This arrangement may be particularly useful when articles tend to collect in the center of the hopper discharge area.

Features of the previous embodiments also may be incorporated into the embodiment of FIG. 4. For example, covers or lids may be disposed over one or both of the hopper inlet and the discharge opening 124. In addition, more or fewer than four magnets may be used, as may be any driving mechanism, such as a handle or a motor.

Another embodiment of the disclosure now will be described with reference to FIG. 5. FIG. 5 is a cross-sectional view of a material handling apparatus 200 and like previous embodiments, FIG. 5 generally includes a hopper 230, a magnet 248 in communication with the hopper 230 to remove articles from the hopper 230, and a discharge 250 to which the magnet 248 conveys the articles.

As illustrated, the hopper 230 includes a front wall 236, an inclined bottom 254, a top 216, and a rear wall 232. A hopper inlet 218 is provided in the top 216 and a hopper outlet 239 is provided proximate the bottom of the front wall 236 and the inclined bottom 234. The hopper 230 defines a hopper volume that preferably is sized to retain all of a predetermined number of articles to be conveyed, with little extra space. A cover or lid 220 may be provided over the hopper inlet 218.

The magnet 248 is disposed on a distal end of an arm 262 attached to a pivot 264. The arm 262 is articulatable on the pivot 264 in the direction of the arrows between a position arranging the magnet proximate the hopper outlet 239 and a position spaced from the hopper outlet.

A discharge outlet 224 is provided spaced from the hopper outlet 239. In a preferred embodiment, the discharge outlet 224 opens substantially vertically downward. Accordingly, when the arm 262 reaches a sufficient distance from the generally vertical position illustrated, the article will fall from the magnet 248, into the discharge outlet 224, and out of the material handling apparatus 210. A tray or other receptacle (not shown) may be placed below the discharge outlet 224 to catch the falling article, for example, for presentation to the user. Alternatively, a lid or door or the like may be provided over the discharge opening, and the article will rest on such lid or door until opened by the user. Once the article falls from the magnet 248, the arm 262 returns to its original, substantially vertical position, to capture another article for conveyance.

In this embodiment, the magnet may be sufficiently strong to move the article along the bottom of the discharge, but the force of gravity acting on the article will overcome the magnetic force holding the article to the magnet when the article is moved over the discharge. Alternatively, the magnet may be an electromagnet that is turned off when it reaches a position above the discharge opening, to release the article.

Although not illustrated in the Figure, a handle such as that shown in FIG. 1 may be provided to articulate the arm about the pivot. Alternatively, a motor could be used. In view of this disclosure, other manual and automatic methods for articulating the arm will be readily appreciated by those skilled in the art.

Although only a single magnet is shown in FIG. 5, any number of magnets disposed on arms may be used. For example, a plurality of arm/magnet combinations like that illustrated may be disposed across the apparatus, to selectively take articles from different areas of the hopper. The arms may be articulated using different drivers. For example, a different handle may be provided for each arm/magnet combination. Or a single handle may be used to successively articulate each arm.

In operation, the angled bottom 234 of the hopper 230 acts to direct articles to the hopper outlet 239. The bottom of the discharge is generally arced to follow the path of the magnet, but this is not required. For example, some or all of the bottom of the discharge could be angled downwardly, instead of arced upwardly, such that gravity acts earlier on the article, to separate the article from the magnet. Put another way, if the bottom of the discharge is distanced from the magnet earlier in the path of the magnet is it is drawn away from the hopper outlet, the article will more readily be removed from the magnet. And, by angling the bottom of the discharge toward the discharge opening, the article can be directed toward the discharge outlet 224.

Yet another embodiment of the invention is disclosed in FIGS. 6A and 6B. Those figures show a cross-sectional view of a material handling apparatus 310 that includes a movable magnet 348 disposed downstream of a hopper 330 into which articles to be conveyed are to be placed. The magnet 348 is disposed on a linear actuator 360 and selectively conveys articles into a discharge 350, disposed substantially below the hopper 330.

More specifically, FIGS. 6A and 6B show that the hopper 330 defines a volume bounded by sides 314 (only one of which is shown), an inclined wall 332, a front wall 336, a bottom 334, and a top 316. A hopper inlet (not shown) is provided in the top 316 or front wall 336 to allow a user to insert articles, preferably a predetermined number at a time, into the hopper 330. A hopper outlet 339 preferably is provided proximate the bottom 334 of the hopper 330. Articles placed in the hopper are directed by the inclined wall 332 toward the bottom 334 of the hopper 330. The articles are removed from the hopper through the hopper outlet 339.

The magnet 348 is actuated by the linear actuator 360 between an attracting position proximate the hopper outlet 339 and a discharge position spaced from the attracting position.

Also in the illustrated embodiment, a stripper plate 380 is disposed on a side of the magnet 348 opposite the actuator 360. When the magnet 348 is in the attracting position, the stripper plate 380 is arranged adjacent to the magnet 348. Accordingly, the magnetic field of the magnet will extend through the stripper plate, holding an article on a face of the stripper plate opposite the magnet 348. As the actuator moves the magnet from the attracting position to the discharge position, the magnet 348 separates from the stripper plate, thereby reducing the effect of the magnetic field on the article. Because the article is disposed over the discharge inlet, a combination of the force of gravity and the reduced pull of the magnetic field will cause the article to drop into the discharge.

The discharge 350 has an inclined wall 357 upon which the article drops, which directs the article to the discharge bottom 352. A user can retrieve the article through the discharge outlet 324. The discharge outlet 324 may be open, as in the example illustrated in FIG. 5, or it may be covered using a lid or door, as in other previously-discussed embodiments. In this embodiment, though, a rotating compartment 370 is provided. As illustrated, the compartment 370 has a generally planar front 372, a bottom 374 perpendicular to the front 372, and an angled back 376 extending from the bottom 374, away from the front 372. The front 372 and bottom 374 preferably conform substantially in size and shape with the discharge outlet 324 and the discharge bottom 352, respectively. The angle between the angled back 376 and the bottom 374 is substantially the same as the angle between the angled wall 353 and the bottom 352 of the discharge 350.

The compartment is disposed to pivot about the corner 378, formed at the seam between the front and the bottom, between a closed position (shown in FIG. 5A) and an open position (shown in FIG. 5B). In the closed position, the front substantially seals the discharge opening, and articles that fall from the magnet will be directed onto the angled wall and thereafter onto the bottom of the compartment. When the compartment is pivoted open, a user can reach behind the front, into the space formed by the compartment, to retrieve the conveyed article. Also in the open position, a distal edge of the angled back of the compartment contacts the top of the discharge (opposite the bottom of the hopper) to substantially prevent flow of air into the apparatus when the door is opened. While atmospheric air will enter during opening and closing the door, it preferably will not enter in either the open or closed positions, thereby allowing for a maintained, substantially oxygen-free environment in the apparatus. Also to that end, the stripper plate 380 and or the magnet 348 may form a seal with the sides of the apparatus, the bottom of the hopper, and the angled wall of the hopper, proximate the hopper outlet 339. Thus, even when the compartment is opened, the hopper 330 can continue to be sealed.

Figure 7A:
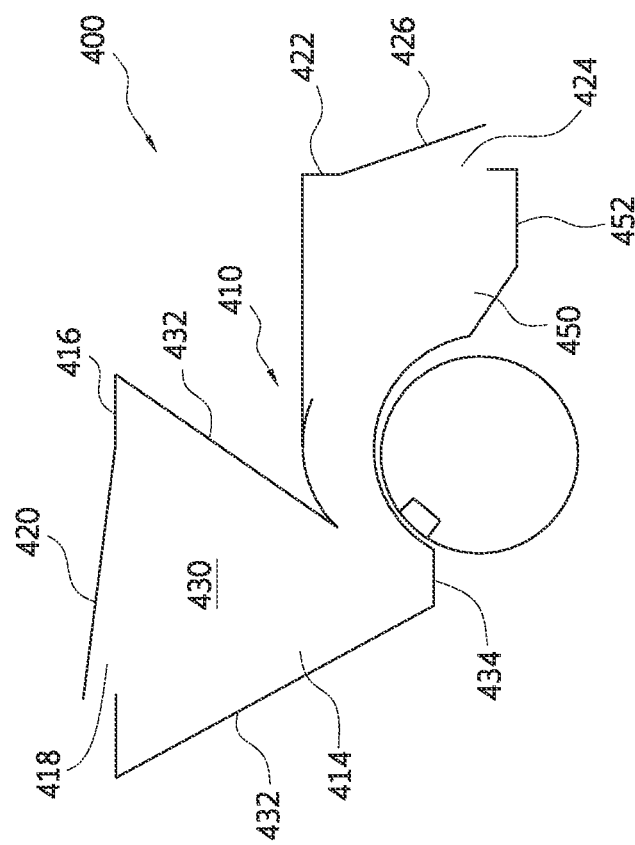
Figure 7B:
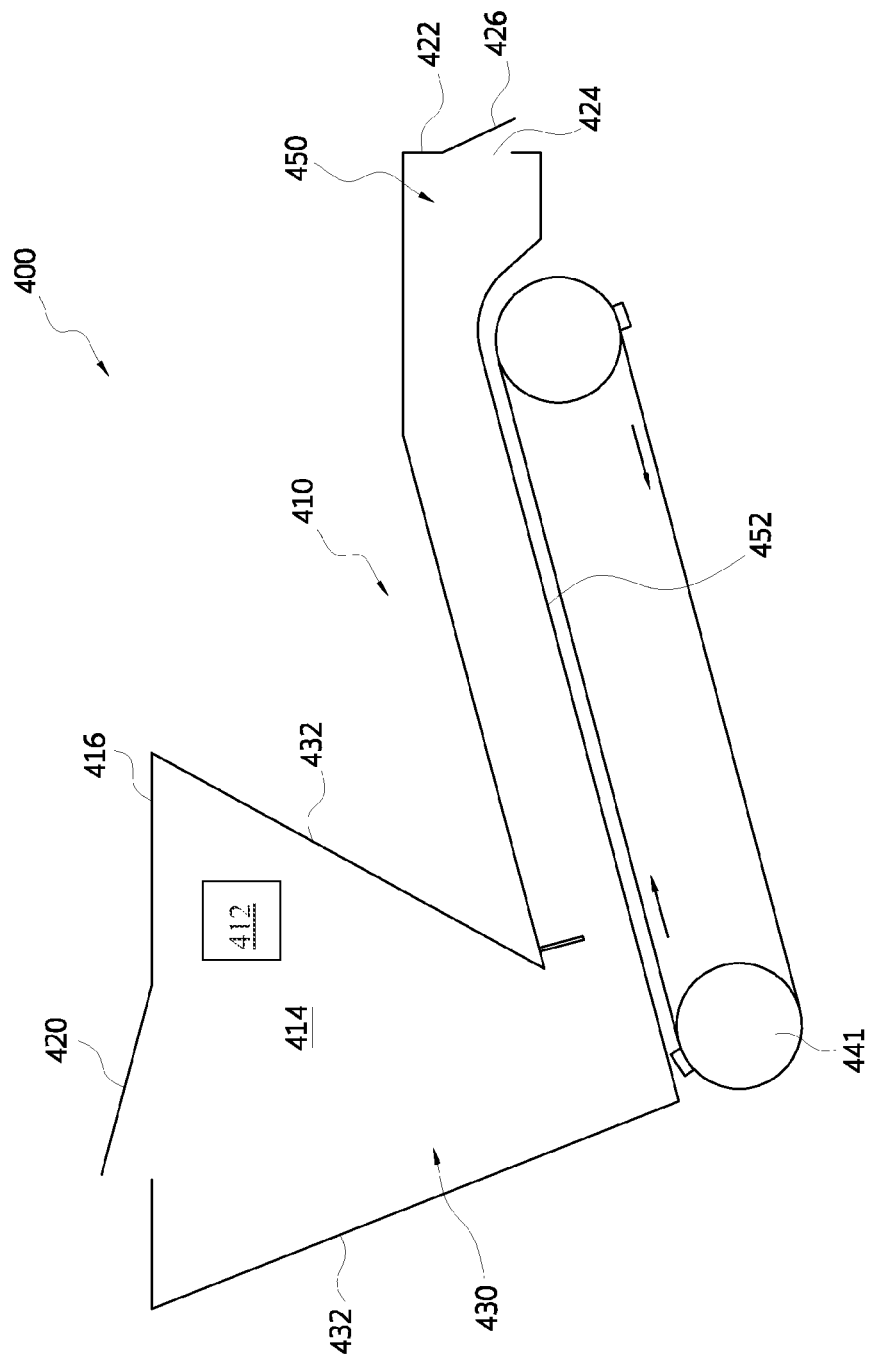

Although embodiments of the present disclosure describe until now include the magnet disposed within the apparatus, this is not required. For example, the inventors also have developed apparatus that convey articles containing a ferromagnetic material with a magnet located outside a space holding the articles. FIGS. 7A-7B are examples of this arrangement.

In both FIGS. 7A and 7B, a material handling apparatus 400 includes a container 410 and a magnet 448. In FIG. 7A, a drum 440 is provided and the magnet is disposed generally on an outer surface of the drum 440, whereas in FIG. 7B, the magnet is disposed on a conveyor 441. In those embodiments, the drum 440 and the conveyor 441 are disposed outside the container 410. The containers 410 generally include a hopper 430, which is a space generally upstream of the magnet 448 and a discharge 450, downstream of the hopper 430. The hopper 430 is generally defined by a front and back walls 432, a hopper bottom 434, side walls 414, a top 416, and a hopper access panel 420 selectively covering a hopper inlet 418. When placed over the hopper inlet 418, the hopper access 420 panel may create a seal with the container 410 about the inlet 418 to prevent ambient air from entering the container 410 through the inlet 418.

The discharge is generally defined by an end wall 422 of the container 410, a bottom 452, the sides 414, and a discharge access panel 426 selectively covering a discharge outlet 424. Like the hopper access panel 420, the discharge access panel 426 may create a seal about the discharge outlet 424, to prevent ambient air from entering the container 410 through the discharge outlet 424.

In FIG. 4A, the container 410 also includes a generally arcuate wall 453, disposed between the hopper 430 and the discharge 450, separating the hopper from the discharge. As illustrated in that Figure, the drum 440 is generally cylindrical, having a continuous sidewall terminating at opposite end walls. The drum 440 is disposed to rotate on its axis, and is situated such that the sidewall is proximate the arcuate section 453 of the container 410. Like in the previous embodiment, the drum 440 of this embodiment may include a number of bores formed therein, with magnets disposed in those bores. As with other embodiments, the bores may be spaced axially along and rotationally about the sidewall.

In FIG. 4B, the conveyor 441 is positioned such that the magnet is disposed to travel along an infinite path, with a portion of the path being proximate the container 410. The conveyor may be a belt and pulleys, a chain-driven belt, or some other known conveyor. The magnets may be fixed on the belt using known techniques. In FIG. 4B, the bottom of the conveyor is angled relative to a horizontal, and the discharge 450 is spaced from the hopper 430. By employing the conveyor, as in FIG. 4B, the discharge and hopper can be any distance desired from the hopper. Moreover, and although not shown, a single hopper could be used to provide articles to any number of discharges, like the one illustrated, by including branches or the like, to the channel between the hopper and discharge, and additional, corresponding conveyors.

In operation of both FIGS. 7A and 7B, the hopper access panel is opened and a supply of articles is placed in the hopper. The articles are gravity-fed into the hopper and come to rest at the bottom of the hopper. In FIG. 7A, they rest at the arcuate section of the container. Once the articles are placed in the container, the hopper access panel is closed, to seal the container. When the articles are oxygen scavengers, the small amount of oxygen in the ambient air in the sealed container is readily absorbed by the scavengers, so an oxygen-free environment is quickly obtained. Because the hopper access door and the discharge access door seal the hopper inlet and the discharge outlet, respectively, the space inside the container remains oxygen-free.

As noted above, the articles are collected at the arcuate wall in the example of FIG. 7A. In that example, actuation of the drum causes one of the magnets disposed in the drum to pass along the arcuate wall, outside the container. The field of each magnet is sufficiently strong that an article arranged inside the container is attracted by the field when it passes the articles, and continued rotation of the drum causes one of the article(s) attracted by the magnet to pass along the arcuate wall, into the discharge. Continued rotation of the drum causes the attracted article(s) to contact the discharge bottom, which stops movement of the article(s) and still further rotation takes the magnet's field away from the conveyed article(s), leaving the article(s) in the discharge.

Similarly, in the embodiment illustrated in FIG. 7B, the conveyor moves a magnet under the bottom of the hopper and the magnet's field attracts one or more articles collected at the bottom of the hopper. A stripper also may be provided to strip stacked articles off each other. Movement of the conveyor in the illustrated direction pulls the attracted article(s) along the bottom of the container, toward and into the discharge. Continued movement once the magnet reaches the discharge causes the bottom of the discharge to stop movement of the article(s) such that continued movement of the conveyor back toward the hopper removes the magnet's field from influencing the article, leaving the article in the discharge 450. The article also may be biased into the discharge by gravity, which can overcome the force of the magnetic field, especially as the field's influence on the article weakens as the magnet is taken away from the discharge, back toward the hopper.

As needed, in both examples illustrated in FIGS. 7A and 7B, a user opens the discharge access panel to retrieve an article for use. As will be appreciated, the act of opening the discharge will allow ambient air into the container, and thus ruin the oxygen-free environment. However, the discharge access panel preferably is only opened for a small amount of time to retrieve the article, so only a small amount of ambient air, and therefore only a small amount of oxygen, enters the container. This small amount of oxygen is readily absorbed by the oxygen scavenger, without any more than a negligible affect on the efficacy of the scavengers. To ensure that the discharge access panel is removed only for a small amount of time, the panel preferably is hinged relative to the opening, and is biased to a closed position. This bias may be created by any known means, including but not limited to a spring or gravity. Put another way, when a user is not contacting the discharge access panel, the panel preferably automatically seals the discharge outlet. The hopper access panel preferably is similarly biased, to ensure that air does not enter the hopper inlet, except when articles are being inserted into the hopper, to file same.

Modifications to the foregoing embodiment are also contemplated. For example, any number of magnets, even a single magnet, may be used. When one magnet is used, it may be centered axially between the end walls. To ensure that all articles are situated proximate the center, so as to be conveyed by the magnet, the walls may be tapered toward the center. Of course, more magnets can result in a quicker throughput, and by spacing the magnets axially, one can ensure that articles across the entire width of the container are conveyed. In a preferred embodiment, regardless of the number of magnets, each is sized and selected to convey one article at a time. In other embodiments, more than one article can be conveyed at a time.

The magnets used in the foregoing examples preferably are rare earth magnets, although any magnet could be used provided it has sufficient magnetism to attract and move the articles, as described. The magnets may be round or they may be bar magnets. For example, in FIG. 7B, bar magnets could be spaced transversely across the conveyor belt. When the articles to be conveyed are oxygen scavengers in packets 412 having a generally rectangular shape, the articles tend to align lengthwise along the length of the magnet. That is, the magnet may also provide an aligning feature, because the articles will align between the north and south poles of the magnet.

FIG. 7C illustrates another modification to the apparatus shown in FIGS. 7A and 7B. That Figure is a cross-sectional view of a material handling apparatus 400 including a volume defined by a hopper 430 and a discharge 450. The hopper 430 has inclined walls 432 terminating proximate a hopper outlet 439. An arcuate wall 453 forms a portion of the discharge 450, proximate the hopper outlet 439. A plurality of magnets 448 are disposed on a rotating member 440 to rotate about an axis 442. Along their path of travel, the magnets 448 pass adjacent the arcuate wall 453, outside of the volume formed by the hopper 430 and discharge 450. As a magnet approaches the hopper outlet 439 in this manner, it attracts, through the arcuate wall, an article to be conveyed. Continued rotation of the magnet in a counterclockwise direction as viewed in FIG. 7C causes the magnet to continue to "carry" the article along the arcuate wall, and eventually to a discharge outlet 424. The force of gravity preferably overcomes the magnetic force holding the articles on the wall, and the article is released by the magnet.

Like in other embodiments, a stripper or the like, for example, formed as a protrusion, may be disposed at the bottom of the arcuate wall, proximate the discharge outlet, to further facilitate removal of the article from the magnetic field, as in previous embodiments. In yet another example, the arcuate wall could extend away from the path of the magnet, i.e., by going radially further from the axis of rotation of the magnets. In this example, the effect of the magnetic field on the article would lessen as the article moved along the arcuate wall, and the article would eventually succumb to gravity, falling from the discharge opening.

Although not shown, a tray or other receptacle may be positioned below the discharge outlet, to receive the conveyed article. Similarly, and as with other embodiments, the inlet to the hopper and the outlet of the discharge may be sealed using a panel, door, lid, or similar apparatus. Alternatively, the article could be delivered to a conveyor or pick-and-place mechanism to insert into a device or package.

As illustrated in FIG. 7, four magnets are spaced at equal circumferential intervals, i.e., at 90-degree intervals. This is not required. More or fewer magnets could be used, depending upon a desired throughput of parts. Moreover, the magnets may be bar magnets that extend substantially across the entire width of the apparatus, or they may be smaller magnets 448, which may or may not be spaced axially along the axis of rotation of the rotating member 440.

As with other embodiments, the rotating member may be rotated manually, i.e., using a handle such as that shown in FIG. 1, or its rotation may be semi- or fully-automated, i.e., using actuators and associated controls.

Figure 8:
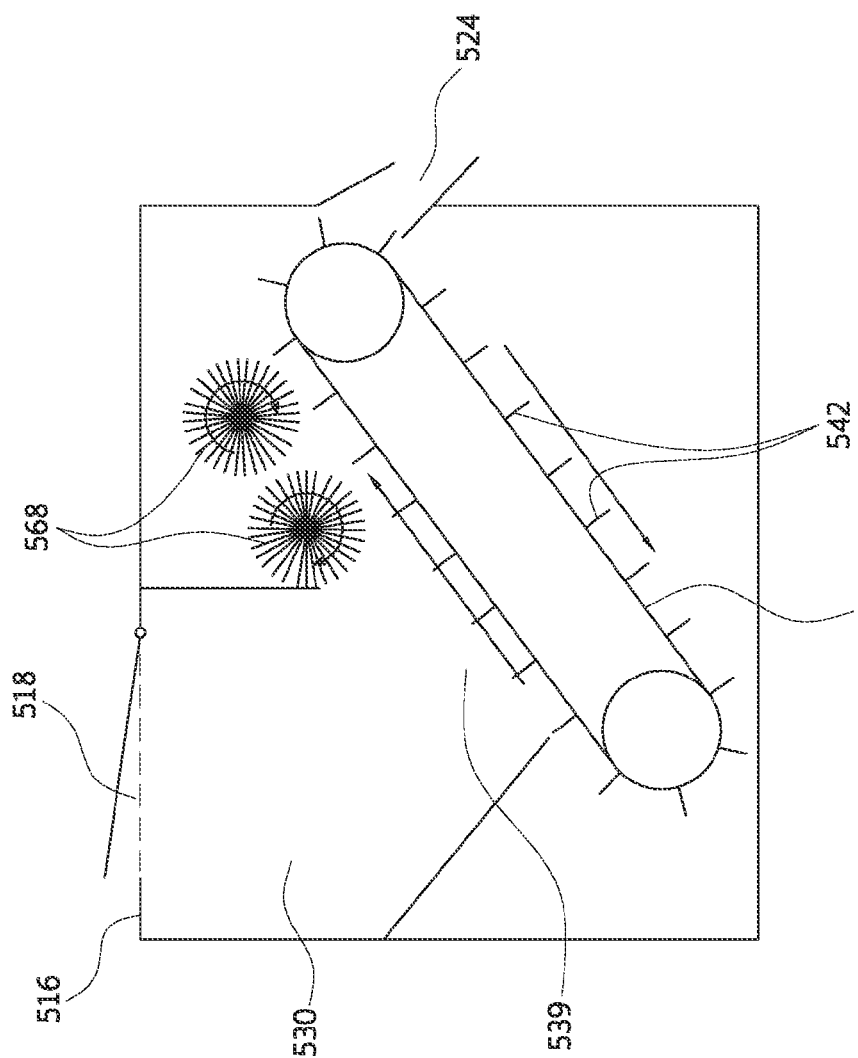
FIG. 8 is a cross-sectional view of yet another embodiment of a material handling apparatus according to the invention.
Figure 9:
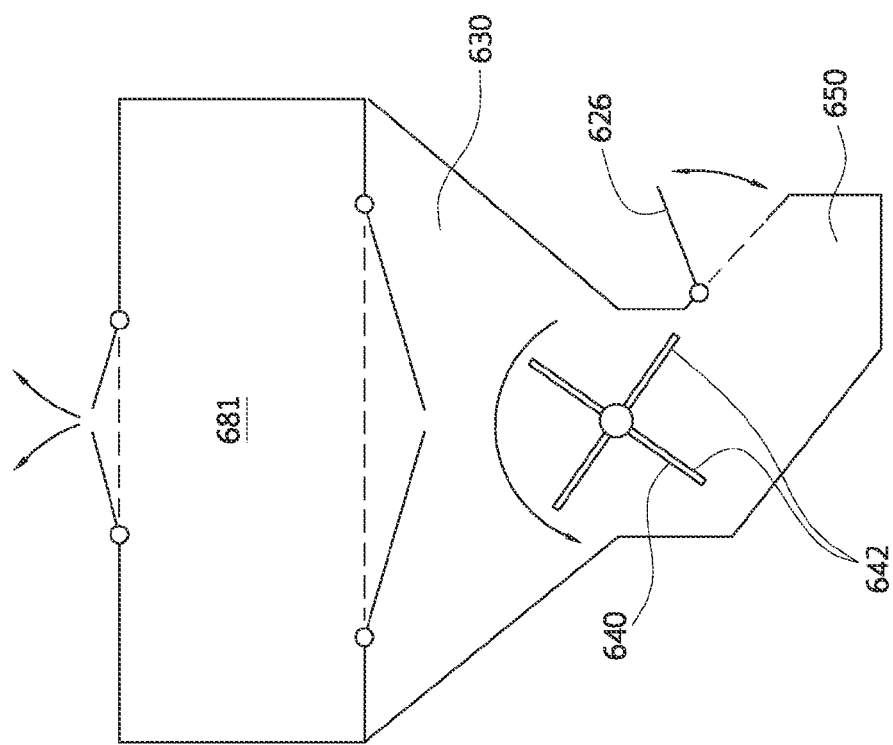
FIG. 9 is a cross-sectional view of still another embodiment of a material handling apparatus according to the invention.
Figure 10:
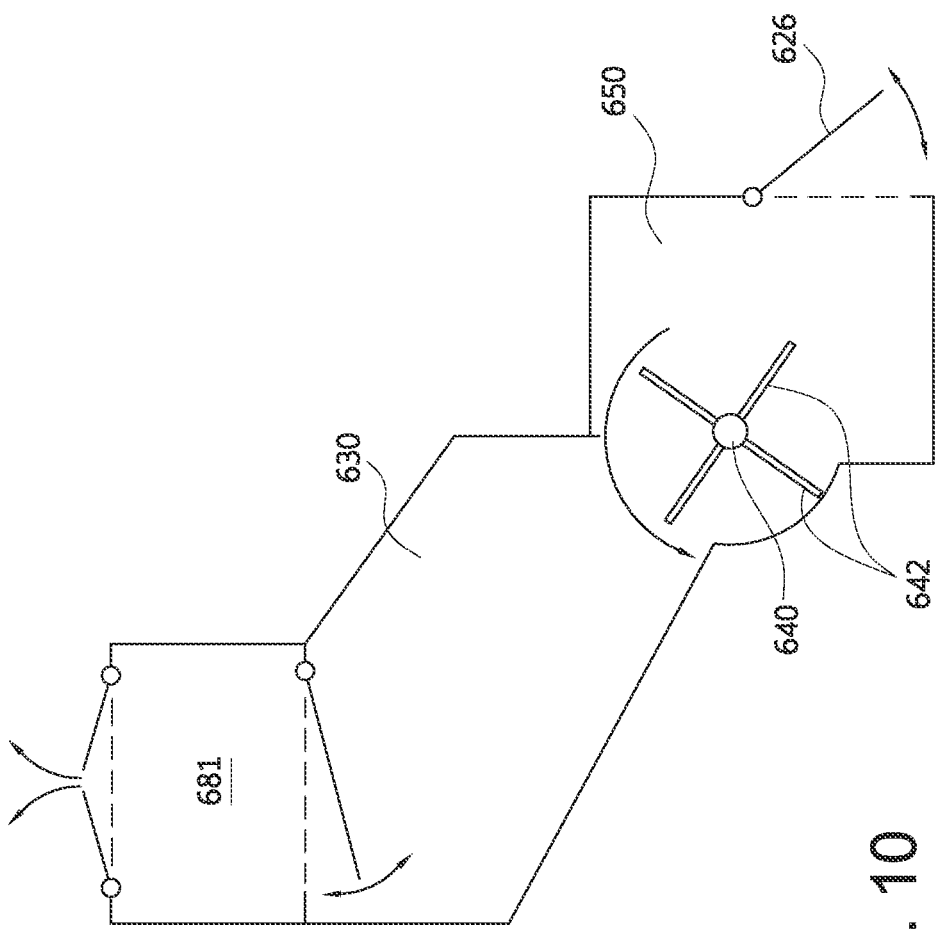
FIG. 10 is a cross-sectional view of yet another embodiment of a material handling apparatus according to the invention.

The embodiments described to this point in the disclosure have generally all included a magnet to convey articles from a hopper to a discharge. However, a magnet is not required, and in the instance of conveying articles having no ferromagnetic properties, a magnet would be useless. FIGS. 8-10 illustrate additional examples of the invention, which do not incorporate magnets to convey articles. These embodiments, however, generally do include a hopper into which a predetermined number of articles can be placed and a discharge through which the articles are conveyed. Moreover, in each of these embodiments, the apparatus is generally sealable. When oxygen scavengers are conveyed, for example, this is desirable so they do not continuously absorb oxygen until placed in a sealed package.

In FIG. 8, a hopper 530 includes a top 516 having an inlet opening 518 formed therein. A door 520 is provided to selectively cover (and in some instances preferably seal) the inlet opening 518. The hopper 530 also includes an inclined wall 532 to direct articles in the hopper 530 toward a hopper outlet 539. When articles reach the hopper outlet 539, they contact a conveyor 540. The conveyor 540 preferably has partitions spaced and sized to receive a single article between adjacent partitions. An article is contained between the adjacent partitions 542 and movement of the conveyor 540 transports the article to a discharge opening 524, spaced from the hopper outlet.

Brushes 568 also are provided that rotate opposite the conveyor 540, as illustrated by the arrows. The brushes 568 are spaced from the conveyor 540 to allow only a single article to pass between the brush 568 and the conveyor 540. That is, if articles are stacked on top of each other, the brushes will contact and push back any stacked articles, allowing passage of only a single article. The user will therefore receive only a single article at a time. Although brushes are shown in FIG. 8, a fixed member, such as baffles or pins also could be used to reject stacked articles, as the front wall 36 was used in the embodiment shown in FIG. 1.

The discharge outlet 524 preferably includes a discharge door, panel, or the like (not shown), to allow for sealing the outlet when articles are not being conveyed.

In the embodiments illustrated in FIGS. 9 and 10, a hopper 630 and a discharge 650 are separated by a rotational member 640 having arms 642 extending radially from a rotational axis. The arms 642 preferably are of sufficient spacing and length relative to the size and shape of the article to accommodate only a single article between adjacent arms 642.

In operation of each of these embodiments, the articles are directed to the rotational member 640 by angled walls in the hopper 630. As the rotational member 640 rotates in the direction shown in the Figures by the arrows, a single article is contained between adjacent arms 642, and conveyed to the discharge opening 650. Once out of the hopper 630, the article drops into the discharge 650. A user can then open the discharge access panel 626 and remove the conveyed article. As with previous embodiments, the entire volume can be sealed by closing the access doors covering the hopper inlet and the discharge outlet.

The embodiments of FIGS. 9 and 10 also have a staging area 681, which is a volume disposed upstream of the hopper 630. This staging area 681 preferably has an inlet through which articles can be inserted and an outlet leading to the hopper. Moreover, the staging area preferably is sealable, to prevent ambient air from entering the staging area 681.

Although not illustrated, the examples shown in FIGS. 8-10 could also utilize magnets in the case of articles to be conveyed being ferromagnetic. For example, magnets could be disposed on the conveyor in FIG. 8, instead of or in addition to the partitions, to help retain articles on the conveyor. The arms in FIGS. 9 and 10 also could include magnets, or the entire rotating member could include a drum such as in previous embodiments, located radially inwardly from the distal ends of the arms. In such an embodiment, the arms would extend radially from the outer surface of the drum.

In each of the foregoing embodiments, the hopper preferably is sized to accept a predetermined number of articles without much additional headspace. Moreover, the hopper may be sealable such that when oxygen absorbers are to be conveyed, they remove substantially all the oxygen from the hopper volume and thereafter a relatively oxygen-free environment is maintained. Accordingly, in the event of a line stoppage, articles cease to be conveyed to the user, and remain in the oxygen-free environment. Because they are in this substantially oxygen-free environment, when the line is up and running again, regardless of how long the downtime, the efficacy of the articles is maintained. The articles need not be thrown away, as in applications not utilizing the material handling apparatus, but perhaps more importantly, the risk of putting a "spent" absorber, i.e., one that already has absorbed a substantial amount of oxygen and therefore will not perform as required in the package, is greatly decreased.

The foregoing embodiments of the present invention are provided as exemplary embodiments and are presently best modes for carrying out the invention. Modifications of these embodiments will be readily apparent to those of ordinary skill in the art. The invention is not intended to be limited by the foregoing embodiments, but instead is intended to be limited only by the appended claims.

The invention claimed is:

1. A material handling apparatus for conveying oxygen reactive packets comprising:
    a hopper holding a plurality of the oxygen reactive packets, each of the oxygen reactive packets containing an iron powder and an electrolyte, and the hopper having an inlet and an outlet and defining a hopper volume for receiving the plurality of the oxygen reactive packets to be conveyed;
    a discharge spaced from and downstream of the hopper;
    a conveyor disposed for conveying the plurality of oxygen reactive packets, one at a time, from the hopper to the discharge;
    a magnet disposed on the conveyor attracting respective oxygen reactive packets to the magnet, via the iron powder contained in the respective packets, for movement together with the magnet, and the magnet being movable by the conveyor between an attracting position proximate the hopper at which the respective packets are attracted to the magnet and a discharge position proximate the discharge at which the respective packets are removed from the magnet; and
    a seal contacting the conveyor between the hopper and the discharge sealing the hopper relative to the discharge.

2. The material handling apparatus of claim 1, further comprising a hopper cover selectively covering the hopper inlet to substantially seal the hopper volume.

3. The material handling apparatus of claim 1, further comprising a stripper disposed proximate the discharge position for removing the respective packets from the magnet into the discharge.

4. The material handling apparatus of claim 3, wherein the stripper is one of a magnetic and a non-magnetic stripper positioned proximate the magnet to contact the respective packets being conveyed.

5. The material handling apparatus of claim 1, further comprising a cover selectively movable over the discharge.

6. The material handling apparatus of claim 1, wherein the conveyor comprises a rotatable drum disposed between the hopper outlet and the discharge, the magnet being fixed to the drum.

7. The material handling apparatus of claim 6, wherein the rotatable drum includes a bore formed in an outer surface thereof and the magnet is retained in the bore.

8. The material handling apparatus of claim 6, wherein the magnet is a first magnet and further comprising a second magnet, the first magnet and the second magnet being fixed to the drum and spaced from each other at least one of rotationally and transversely.

9. The material handling apparatus of claim 7, further comprising a retainer disposed over the magnet and a portion of the surface of the drum to cover the magnet.

10. The material handling apparatus of claim 6, further comprising a drive mechanism for rotating the drum.

11. The material handling apparatus of claim 10, wherein the drive mechanism is hand-operated.

12. The material handling apparatus of claim 6, wherein the seal comprises a sealing flap pivotable about an axis spaced from the drum and having a distal end contacting an outer surface of the drum.

13. The material handling apparatus of claim 1, further comprising a sensor sensing presence of the respective packets in the discharge.

14. The material handling apparatus of claim 13, wherein the drum is rotated when the presence of the respective packets is not sensed in the discharge.

15. The material handling apparatus of claim 1, wherein the hopper includes an inclined wall generally sloping toward the magnet.

16. The material handling apparatus of claim 1, wherein the hopper volume is sized to be slightly larger than a volume of the plurality of oxygen reactive packets placed into the hopper.

17. A material conveying apparatus comprising:
- a hopper defining a hopper volume holding a plurality of articles containing iron;
- a discharge spaced from and downstream of the hopper;
- a conveyor comprising a magnet movable between the hopper and the discharge, the magnet attracting the articles containing iron to the conveyor; and
- a movable seal biased to contact the conveyor to seal the hopper volume relative to the discharge,
- wherein at least one of the hopper volume and the discharge is sealed relative to ambient atmosphere.

18. The material conveying apparatus of claim 17, further comprising:
- a hopper cover for selective placement over a hopper inlet to seal the hopper volume.

19. The material conveying apparatus of claim 17, further comprising a discharge cover for selective placement on the discharge to seal the discharge.

20. The material conveying apparatus of claim 17, wherein the seal comprises a sealing flap pivotable about an axis spaced from the conveyor and having a distal end contacting an outer surface of the conveyor.

* * * * *